United States Patent Office 3,390,613
Patented July 2, 1968

3,390,613
ELECTROHYDRAULIC ACTUATORS
Roy Westbury, Bridgnorth, and Peter John Maltby, Codsall, England, assignors to H. M. Hobson Limited, London, England, a company of Great Britain
Filed May 31, 1967, Ser. No. 642,399
5 Claims. (Cl. 91—363)

ABSTRACT OF THE DISCLOSURE

An electrohydraulic actuator which provides both electrical feedback and also mechanical feedback which increases progressively over a narrow band of displacement of the output member of the actuator from a selected position, assumed by the actuator when electrical power is cut off, and thereafter remains constant upon further displacement of the output member.

---

It is often a requirement of an electrohydraulic actuator that its output member should be capable of taking up a predetermined position to a high degree of accuracy when the electric power is switched off.

One established method for achieving this involves the use of a hydraulically powered clutch which operates when a solenoid valve is de-energised and forcibly drives the output member of the actuator to a predetermined position. This method is costly in size and weight and involves very close control of component tolerances to ensure reasonable accuracy of the clutched position.

The object of the present invention is to meet the above-mentioned requirement without incurring the penalties of size, weight and inaccuracy of known systems.

It is also known to provide mechanical force feedback from the output member of an actuator to the armature of an electromagnetic torque motor which drives the servo valve of the actuator. The use of mechanical feedback has been investigated by many people in the past, primarily with the aim of dispensing altogether with electrical position feedback, and secondarily with the aim of achieving a self-centering action when the electric input signal is switched off. However, it is usually found that when the torque saturation limits of the torque motor are taken into account, the highest mechanical feedback gain which can be used is insufficient when high accuracy is required.

For this reason, therefore, the present invention does not attempt to dispense with electrical feedback, which is retained as the principal feedback term and upon which the normal operation of the actuator is dependent. Mechanical feedback is introduced solely for the purpose of ensuring that the actuator will accurately move to a predetermined position when all electric power is switched off or is lost due to failure.

The invention provides an electrohydraulic actuator having electrical feedback and also a mechanical feedback which increases progressively over a narrow band of displacement in either direction of the output member of the actuator from a selected position to be assumed by the output member when the electric power is off and thereafter remains constant.

Figure 1:
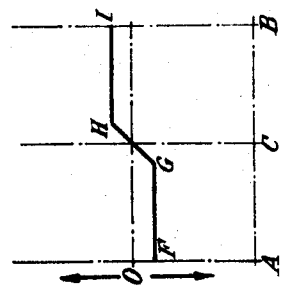
Figure 2:
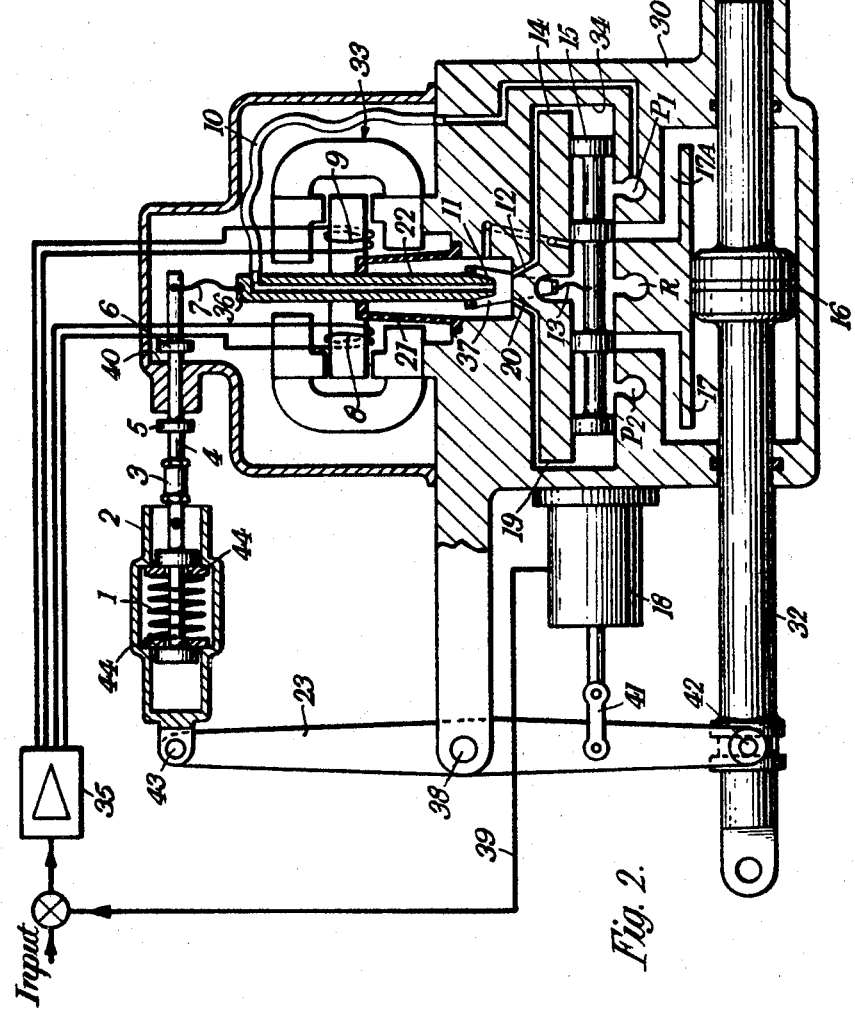

One embodiment of electrohydraulic actuator according to the invention suitable for actuating a control surface of an aircraft is illustrated by way of example in the accompanying drawings in which:

FIG. 1 is a graph illustrating the mechanical feedback characteristics of the actuator, and FIG. 2 is a sectional diagrammatic view of the actuator.

The actuator shown in FIG. 2 comprises a cylinder block 30, pivoted at 31 to a fixed portion of an aircraft structure and containing an output piston 16 and a servo valve 15. The piston rod 32 of the piston 16 is connected to the control surface, not shown.

High pressure oil is introduced from a suitable source, not shown, into cavities $P_1$ and $P_2$ in the cylinder block 30. Another cavity R in the cylinder block is connected to a return line. A limited quantity of oil flows out of the cavity $P_1$ via a flexible pipe 10 and thence through the hollow armature 22 of an electromagnetic torque motor 33, which is mounted in a flexible bush 21, the oil being discharged through a nozzle 11 at the end of the armature 22. This oil impinges on two receiver ports 12 and 20 which are connected by passages 14, 19 to opposite ends of a bore 34 containing the servo valve 15. The armature 22 is mounted on a pivot 36 for movement about an axis perpendicular to the plane of the drawing and under null conditions it occupies a position such that equal pressures are developed in the passages 14, 19 and the valve 15 is in a condition of equilibrium with no net pressure acting on it and occupies the closed position shown.

When an input current is supplied from an amplifier 35 to the coils 8 and 9 of the torque motor 33, a force is developed on the armature 22 which rotates it through a small angle about its pivot 36. This causes the jet of oil emerging from the nozzle 11 to impinge more directly on one of the receiver ports 12, 20 causing a rise in pressure on one end of the valve 15 and a fall in pressure on the other end. The resulting net force on the valve 15 causes it to move from its closed position. In moving, the valve transmits force via a feedback spring 13 and a connecting plate 37 to the armature 22 in the sense to return it towards the null position. The valve 15 continues to move until the force created in the feedback spring 13 is equal to that developed by the circuit in the torque motor 33. When this occurs the nozzle 11 is again symmetrically positioned with respect to the receiver ports 12, 20 and the valve 15 comes to rest in a position determined by the magnitude of the current in the torque motor. In this position oil will flow from one or other of the pressure cavities $P_1$, $P_2$, past the valve 15, and through one or other of ducts 17, 17A to one side of the piston 16 and oil will flow from the other side of the piston through the other duct past the valve 15 to the return cavity R. The movement of the piston 16 rocks a lever 23 about a central pivot 38 by which it is mounted on the cylinder block 30. Rocking movement of the lever 23 displaces an electrical pick-off 18 and a push rod 4. The lever 23 is connected to the pick-off by a link 41 and is pivoted at one end 42 to the piston rod 32 and at the other end 43 to a spring box 2, the housing of which contains a spring 1 disposed between collars 44 on the push rod 4. The signal generated in the pick-off 18 is fed back through a line 39 to the amplifier where it is subtracted from the input command signal to reduce the current in the torque motor 33. At the same time the displacement of the push rod 4 causes deflection of a spring 7, connected between the push rod 4 and the armature 22, which generates force on the armature 22 in opposition to that created by the current in the torque motor 33. The combined effect of these influences is to cause the valve 15 to be returned to its closed position, which it reaches, so terminating movement of the piston 16, when the displacement of the piston 16 has generated a combined mechanical and electrical feedback sufficient to cancel the input signal to the amplifier 35.

The amount of mechanical feedback which can be generated is determined by stops 5 and 6 on the push rod 4 which coact with a bracket 40 to limit its displacement. Displacement of the piston 16 beyond the point at which one of these stops 5 or 6 comes into operation is permitted by collapse of the spring 1.

If all electrical power is removed from the servo amplifier all electromagnetic force on the armature 22 will be removed. In this condition the piston 16 will move to that position at which the force developed in the spring 7 will be zero and the valve 15 will be closed. Any attempt by the piston 16 to drift from this position will, within the limits imposed by hysteresis, be countered by the force which would be generated in the feedback spring 7.

The precise position which the piston 16 will assume when electric power is switched off may be adjusted by means of a turnbuckle 3 which effectively increases or reduces the length of the push rod 4.

FIG. 1 shows the mechanical feedback characteristics of the actuator, the position of the output piston being plotted as abscissae, the fully retracted position being shown at A and the fully extruded position at B. The mechanical feedback force on the armature is plotted as ordinates, zero feedback force being indicated at O. The position which will be taken up by the output piston 16 when the electrical power is cut off is indicated at C, but as just explained this can be varied by adjustment of the turnbuckle 3.

As will be noted the mechanical feedback remains constant over the range FG, increases progressively over the narrow band CH of displacement of the output piston 16 and remains constant over the range HI. The points G and H, of course, represent the points at which the stops 5 and 6 prevent further displacement of the push rod 4. Such feedback yields high accuracy and provides sufficient gain to enable it to be used effectively with an electromagnetic torque motor without causing premature satuartion of the motor or otherwise unduly affecting the normal performance of the actuator.

What we claim as our invention and desire to secure by Letters Patent is:

1. An electrohydraulic actuator comprising a hydraulically actuated output member, a hydraulic servo valve movable in opposite directions from a closed position to effect corresponding movements of the output member, an electrical device operable under control of electrical input signals to shift the servo valve from its closed position, and means controlled by the output member for providing both an electrical feedback to the electrical device and also a mechanical feedback to the electrical device which increases progressively over a narrow band of displacement of the output member in either direction from a selected position and thereafter remains constant upon further displacement of the output member from said selected position, the output member assuming said selected position when electric power is cut off from the electrical device.

2. An actuator as claimed in claim 1, in which the electric device includes an electromagnetic torque motor having a hollow pivoted armature terminating in a nozzle and connected to the servo valve by a spring and which actuator includes means for supplying liquid under pressure through the armature and nozzle to receiver ports connected to opposite ends of a bore containing the servo valve, which valve moves from its closed position as the result of differential liquid pressures on its ends caused by movement of the armature from a null position.

3. An actuator as claimed in claim 2, in which the means providing mechanical feedback comprises a push rod operated by movement of the output member and connected to the armature by a feedback spring, and stops for limiting the movement of the push rod in both directions.

4. An actuator as claimed in claim 3, in which the output member is connected to the push rod by a lever through a spring box which permits of continued movement of the lever after the push rod has been arrested by a stop.

5. An actuator as claimed in claim 4, in which the lever is connected to an electrical pick-off arranged to provide an electrical feedback signal to the motor.

References Cited
UNITED STATES PATENTS

| | | | |
|---|---|---|---|
| 2,785,659 | 3/1957 | Reip | 91—3 |
| 2,939,430 | 6/1960 | Westbury | 91—363 |
| 3,171,329 | 3/1965 | Rasmussen | 91—388 |
| 3,282,283 | 11/1966 | Takeda | 91—3 |
| 3,362,296 | 1/1968 | Gray et al. | 91—387 |

PAUL E. MASLOUSKY, *Primary Examiner.*